Inventor

Edward W. Young

By Paris Haskell & Levine

Attorneys

Inventor
Edward W. Young,
By Pais, Haskell & Levine
Attorneys

United States Patent Office 3,208,046
Patented Sept. 21, 1965

3,208,046
CODE GENERATOR

Edward W. Young, Philadelphia, Pa., assignor, by mesne assignments, to United Aircraft Corporation, a corporation of Delaware Filed Nov. 29, 1961, Ser. No. 155,723
15 Claims. (Cl. 340—172.5)

This invention generally relates to electronic code generators for producing predetermined time sequences of electrical pulses as controlled selectively by a keyboard or similar selective means, and is particularly concerned with such generators employing magnetic circuits having saturable cores.

Generally, according to one preferred embodiment of the invention, there is provided a pulse code generator of this type employing a plurality of saturable magnetic cores arranged as a storage register, with a different core being provided for each digit or order of the code. Each of the cores is adapted to be selectively placed in one polarity of saturation or the reverse polarity, as controlled by a keyboard or other control means depending upon whether a zero or a one is to be produced for that digit in the output pulse sequence. Means are provided for automatically reading out the predetermined coded information being stored in the cores by cycling the register in a sequential manner, thereby to automatically produce over a single output line a pulse train, with the existence of pulses or absence of pulses at each different time instant in the pulse train signifying whether or not that particular digit in the code is a one or a zero.

According to further features of the invention, the preferred generator is readily adaptable to being coded in any one of a group of different number coding systems; including the binary, trinary, decimal, or combinations thereof, as well as being coded in a random or arbitrary fashion, if desired. This coding system may also be varied from one number code system to another very easily by changing the keyboard switches and wiring interconnecting the keyboard and the magnetic cores. According to the invention, these components may be procured in the form of a detachable plug-in unit or the like for rapidly permitting a change in the code from one number system to another.

It is accordingly a principal object of the invention to provide a pulse code generator comprised exclusively of magnetic and solid state components that may be made quite small in size.

A further object is to provide such a pulse code generator that is readily convertible into any one of a number of different code systems.

Other objects and many additional advantages of the invention will be more readily understood by those skilled in the art after a detailed consideration of the following specification taken with the accompanying drawings, wherein.

Figures 1, 2, 4:
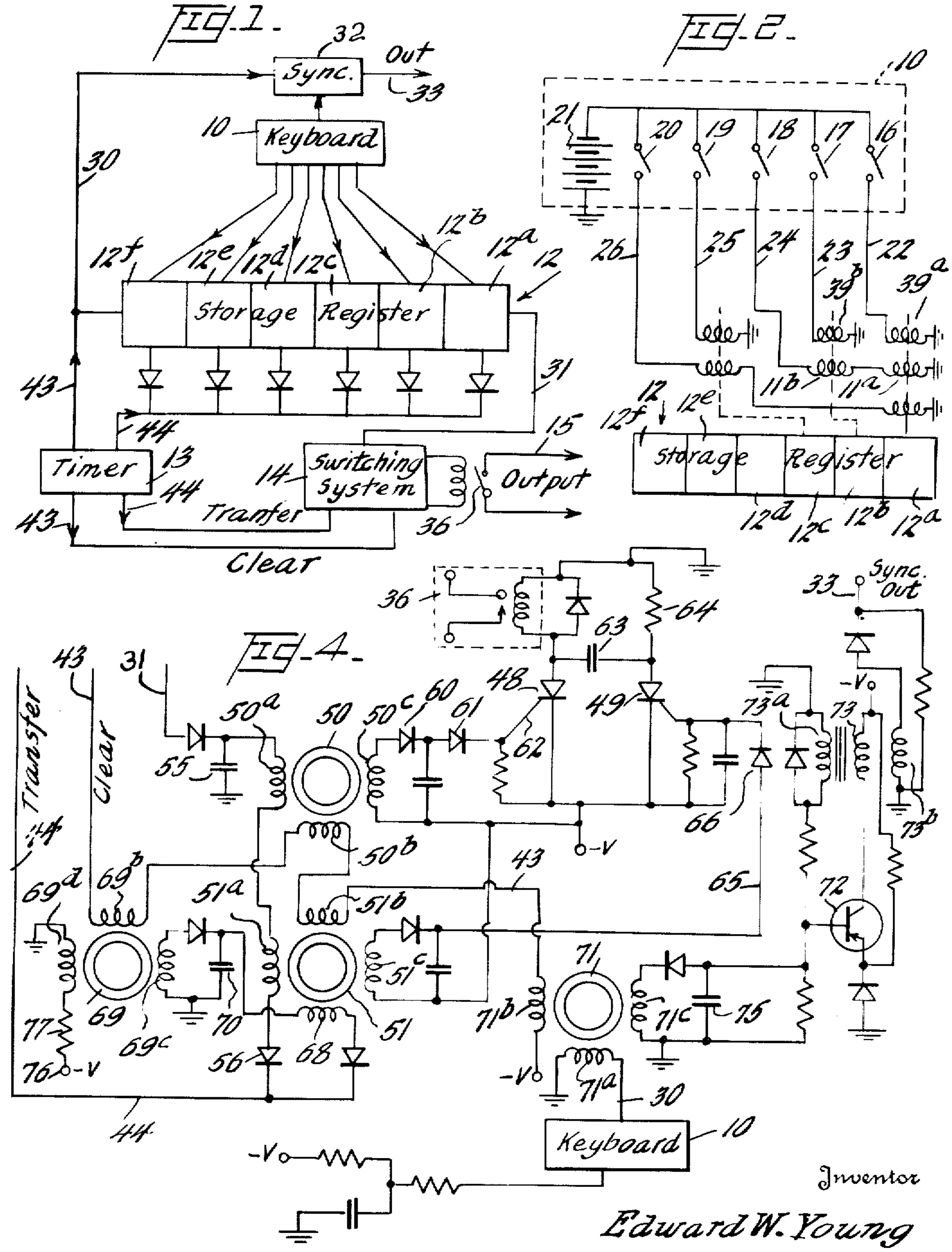
FIG. 1 is a block diagram representation of a preferred pulse code generator system according to the invention.
FIG. 2 is an electrical schematic drawing, partially in block diagram form, and illustrating electrical details of one keyboard and wiring arrangement.
FIGS. 3 and 4 are electrical schematic drawings illustrating preferred electrical circuits for the system of FIG. 1.

Referring now to the drawings and initially to FIG. 1, the pulse code generator system generally comprises a keyboard 10 including switches and wiring or other appropriate selecting means for determining the pulse code number to be produced, and functioning to convert the keyboard selections into pulses directed to different stages of a storage register 12, and means including a cyclically operating timer 13 and switching system 14 for serially reading out the code number previously entered into the storage register in the form of a serial pulse train of unequally spaced pulses being produced over output line 15.

As best shown in FIG. 2, illustrating one elementary form of keyboard arrangement, the keyboard 10 may comprise a series of switches 16 to 20, inclusive, that are each connected to a different actuating button (not shown) whereby the switches may be selectively actuated by depressing the button or buttons desired. All of these switches have one terminal thereof being energized in common by a source of potential 21 and the other terminal being connected serially to series connected windings of one or more of the magnetic stages according to the code desired.

For example, in the illustration shown in FIG. 2, the code being used is in the binary number system whereby depressing the first key 16, energizes only the winding **39*a* of the first stage 12*a* of the register to enter the binary number 000001 into the register. Similarly, depressing the second key 17, energizes only winding 39*b* of the second stage 12*b* to enter the binary number 000010; depressing the third key 18, energizes both the first and second magnetic stages through series connected coils 11*a* and 11*b* to enter the number 000011; depressing the fourth key 19**, enters the binary number 0000100, and so forth. As is believed now evident, the keyboard switches and wiring may be constructed to convert the keyboard selections into any one of a large number of different codes, depending upon the intended use of the code generator; and once this code has been selected, the system functions to produce pulses in that particular code selected.

According to the invention, it is intended that system may be equipped to operate in any one of a number of code arrangement systems by providing different keyboard switches and wiring (for each of different codes) in a removable plug-in form, whereby the different plug-in units may be inserted so that the system may operate in any one of the desired code systems compatibly with the code used by the computer or other data handling load with which the generator is to be employed.

Returning to FIG. 1, upon depression of the selected switch of the keyboard 10 and entry of the code number into the storage register 12, a synchronizing circuit 32 is simultaneously actuated by the keyboard 10 to produce an output pulse over line 33 thereby signaling that a code number has been entered into the register 12 and that the serial readout of the pulses will commence. For performing this serial readout, there is provided a timer or clock mechanism 13 that repetitively produces a first series of constant current clear pulses over line 43 and a second series of time delayed transfer pulses over line 44, respectively, with each of the transfer pulses being time delayed from a corresponding one of the clear pulses. These two series of impulses are directed to the register 12 and operate to successively transfer the digits contained in the different stages serially through the register 12 whereby at the output of the register over line 31 there is produced a time sequence of impulses corresponding in number to the number of stages in which a digit has been originally entered and being spaced from one another in time according to the spacing of the stages having the digits. For example, presupposing that the binary number 010101 has been originally entered into the register 12, then at the time instant of the first readout, a pulse is produced over output line 31 corresponding to a one in the lowest order of this binary number. At the next succeeding instant of readout, no pulse is produced over line 31 since the second digit of the stored number is a zero. However, at the third time instant, an output pulse is again produced corresponding to the one originally entered in the third stage **12*c* of the register and similarly at the fifth instant a pulse is produced corresponding to the one originally entered into the fifth stage 12e. In this manner, as the storage register is successively pulsed by the timer 13, a series of time spaced pulses are produced over output line 31 corresponding to the code number originally entered, and the storage register 12 is simultaneously reset to its zero condition in readiness for new entries to be made by actuation of the keyboard 10** or other selecting means.

The serial code of pulses being produced over register output line 31 may be applied directly to a computer or other data handling apparatus but it is preferred to direct these low level impulses to an amplifying and switching system 14. The amplifying and switching system 14 operates a suitable switching relay 36, to apply energization to a utilizing device or load (not shown).

Recapitulating the overall operation of the system briefly, the system provides a means including a keyboard 10 and wiring for simultaneously entering into the various stages of the storage register 12 the code number to be reproduced. The code number is entered as a series of digits of a multidigit number, with each digit being entered into a different stage of the storage register corresponding to that order of the number. Upon entry of the number into the register, a synchronizing output pulse is produced over line 33 signaling that the automatic conversion of the number into serial pulse code form is about to be commenced. Thereafter, an automatically operating timer 13 producing two series of impulses over a clear line 43 and a transfer line 44, successively energizes the storage register 12 in such a fashion that the digits contained in each stage are successively transferred to the next succeeding stages in a regular recurring order, whereby over the single output 31 there is produced a serial pulse train of electrical impulses corresponding in spacing to the code number originally entered. This serial train of pulses is finally directed to an amplifying and switching system 14 for converting the pulses into such form as may be employed by the output load device.

Figure 3:
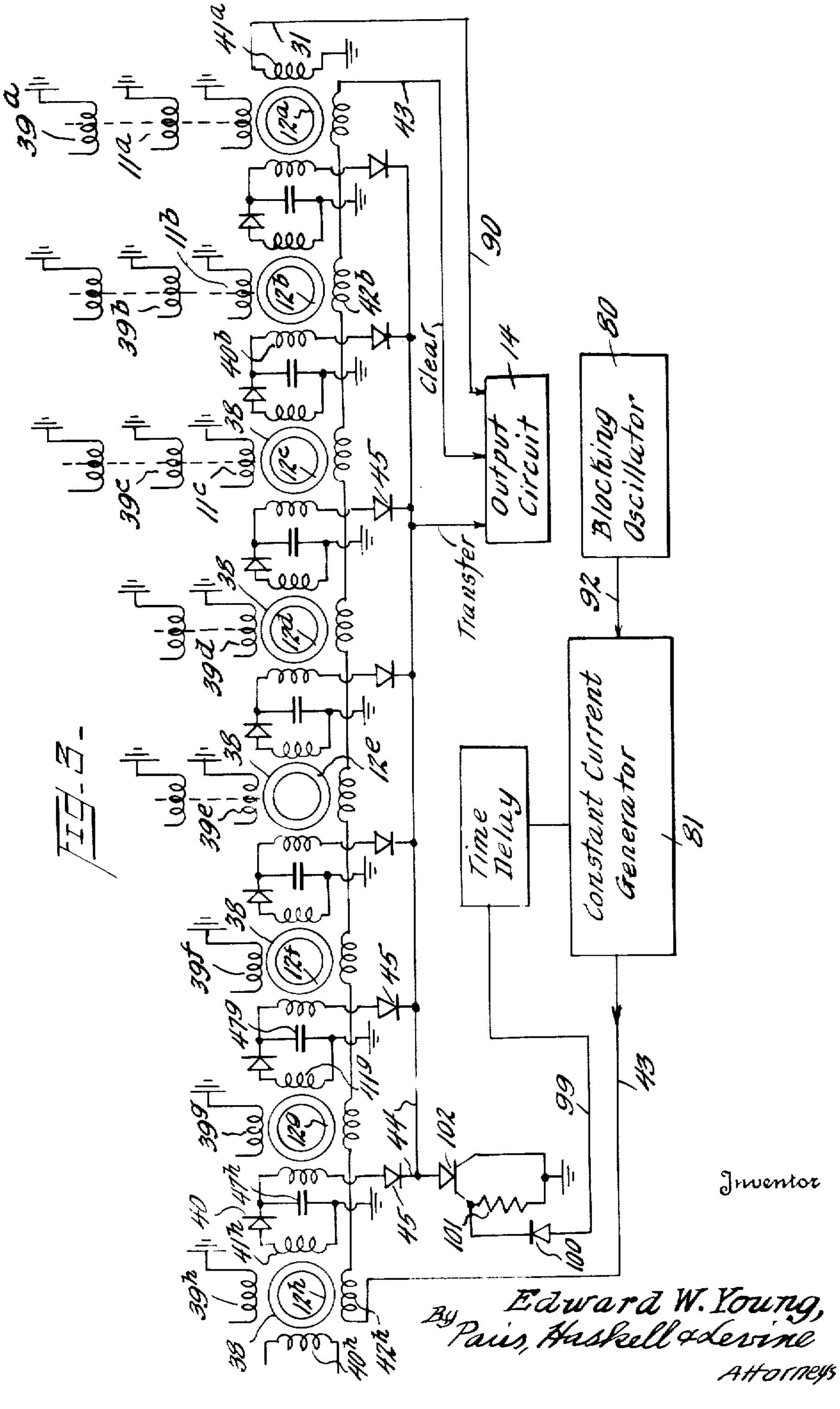

FIGS. 3 and 4 illustrate preferred circuits for the storage register 12 and output switching system 14. As shown, the storage register 12 is comprised of a plurality of substantially identical stages being interconnected in a cascaded relationship, with each stage having a separate magnetic core 38 that is adapted to be normally saturated in one direction in the event that a digit is not stored therein or saturated in the opposite direction to store a digit therein. For simultaneously entering the code number into the various stages, each of these saturable cores 38 is provided with a number of input windings as discussed above in FIG. 2 with the different windings being variously interconnected in series with the keyboard switches, thereby to be energized by pulses received upon closure of the keyboard switches. Upon any one or more of the stages being energized simultaneously, the saturation of its core 34 is reversed from its previous condition to store a digit therein. Since all of the stages of the register are substantially the same, a description of the mode of operation of the first two lowest order stages 12a and 12b should be sufficient for an understanding of this preferred circuit.

As shown, each of these first two stages, 12a and 12b is provided with a number of additional windings. Referring to stage 12a, there is provided a transfer winding 40a, a clear winding 42a, and an output winding 41a. Similarly, stage 12b is likewise provided with these additional windings. The clear windings 42a and 42b of the two stages, 12a and 12b, respectively, are connected in series as shown and are adapted to be energized together by constant current impulses being produced over the clear line 43. The transfer windings 40a and 40b on the other hand are connected in parallel to the transfer line 44 through suitable diodes 45, as shown, to permit pulses of only the correct polarity to pass through these windings.

In operation, after the entry of digits in the storage register 12, a constant current pulse is produced over line 43 and directed to energize the series connected clear windings 42a of stage 12a and winding 42b of stage 12b. In the event that stage 12b is in its saturated condition corresponding to the previous entry of a one therein, the clear impulse being directed through winding 42b reverses the direction of saturation of the core 38 from a saturation condition indicating the storage of a one back to its zero condition and produces a flux change in the core which induces a voltage in the output winding 41b. This voltage in winding 41b is of proper polarity to produce a pulse through diode 46 which is stored on capacitor 47b. Similarly, in stage 12a, the clear impulse over line 43 and being directed through clear winding 42a reverses the saturation of the core of stage 12a, in the event that this core has previously stored a one therein, thereby producing an impulse at winding 41a to store a charge on capacitor 55 (FIG. 4). Thus, upon a clear impulse being produced over line 43, each of the stages 12b and 12a reverse their direction of saturation, in the event that a digit has previously been stored therein, to store a charge on their output capacitors 47b and 55, respectively. On the other hand, if either or both of these stages are in their zero saturation condition and have not previously stored a digit therein, the clear impulse over line 43 produces no change in the flux in the cores of 12b and 12a and the output capacitors thereof 47b and 55 remain uncharged.

A short time interval after the production of the clear impulse over line 43, a transfer impulse is produced to control the transfer line 44. This transfer impulse operates to enable the discharge of capacitor 47b through winding 40a, in the event that it has previously stored a charge. The direction of current flow through the transfer winding 40a and the polarity of the winding 40a and the core 12a are such that in the event that the capacitor 47b is discharged through the input winding 40a, the condition of the core 12a is reversed from its zero or nondigit storing condition to the condition of storing a one. Consequently, in the event that a digit was previously stored in the preceding stage 12b, the functioning of a transfer pulse on line 44 permits this digit to be transferred to stage 12a. Thus, upon the application of a clear impulse over line 43, all of the stages that have previously received a one are cleared to their zero condition of saturation, and a charge is applied to their associated output capacitors 47. Upon the later application of a transfer impulse to control transfer line 44, the charges stored on capacitors 47 are thereupon discharged through the input windings of the next succeeding stages thereby to transfer the pulses in step-by-step arrangement from stage to stage along the chain of stages of the storage register 12.

In this manner, the repetitive application of clear pulses over line 43 and time delay transfer impulses operate to transfer the digits stored in each of the stages to the next succeeding stage in regular sequential order as desired until all of the digits previously stored in the register 12 have been transferred out of the register and over output line 31 leading from the output winding 41a of the first or lowest order stage 12a.

For coupling each of the train of output pulses over line 31 from the storage register to an output load (not shown), there is provided a power switching circuit 14, as shown in FIG. 4, including a pair of silicon control rectifiers 48 and 49 that are connected in back-to-back relationship for selectively energizing a relay circuit 36 in response to each impulse received from the storage register 12. The switching rectifier 48 is controlled by a magnetic triggering circuit including a saturable core 50, and the companion switching rectifier 49 is controlled by a magnetic triggering circuit including a saturable core 51. In operation, each output pulse over line 31 from the storage register 12 is applied to charge the capacitor 44 which in turn, is connected to discharge through both input winding 50*a* of the first trigger circuit and winding 51*a* of the second triggering circuit 51. However, in the same manner as in the operation of the stages of the storage register, the capacitor 55 does not discharge through the windings 50*a* and 51*a* until a transfer impulse is received to control transfer line 44, which transfer pulse impulse serves to unblock the diode 56 and permit passage of current through these windings. Consequently upon the next transfer impulse occurring over line 44, the diodes 56 are unblocked, and in the event that a charge exists on capacitor 55, the capacitor 55 discharges a pulse through windings 50*a* and 51*a* of the two magnetic triggering circuits. This pulse through winding 50*a* changes the condition of saturation of core 50 to store a one therein, and upon the next succeeding clear impulse being directed over line 43 and through winding 50*b*, the saturation of core 50 is reversed to its initial condition, thereby inducing a voltage in output winding 50*c* of such polarity that a pulse passes through diode 60 and diode 61 to the control electrode 62 of silicon conrtol rectifier switch 48. Upon receiving this impulse, the silicon control rectifier 48 is triggered into conducting condition and a current flows through the winding of relay 36, closing the relay contacts, and making electrical connection to the output load circuit.

The second magnetic triggering circuit 51 functions to operate the companion silicon control rectifier 49 at the time of each clear impulse being received over line 43 in the event that no output pulse has been previously received from the storage register 12. However, if an output pulse from the storage register has been previously received and stored on the capacitor 55, as discussed above, the second magnetic triggering circuit 51 is disabled and does not generate an output pulse to trigger the second silicon control rectifier 49. Thus, upon an output pulse being received from the storage register, and stored on capacitor 55, the first magnetic trigger circuit 50 produces an output pulse, at the time of receiving each clear impulse over line 43, to trigger the silicon control rectifier 48 and thereby energize the relay 36 whereas in the event that an output pulse has not been received from the storage register 12, the second magnetic triggering circuit 51 produces an output pulse upon receiving a clear impulse over line 43, which serves to trigger the second control rectifier 49. For performing this latter function, the second magnetic triggering circuit 51 is provided with an additional input winding 68 that is wound in opposition to the first-mentioned input winding 51*a*. The second input winding 68 is repetitively energized by a magnetic oscillator, including a saturable core 69, whereby at the time that each transfer pulse is produced over line 44, an impulse is received over winding 68 from the magnetic oscillator, including a saturable core 69, whereby at the time that each transfer pulse is produced over line 44, an impulse is received over winding 68 from the magnetic oscillator circuit which serves to reverse the direction of saturation of the magnetic triggering circuit 51. Upon the next succeeding clear impulse being produced over line 43, a clear impulse is directed through clear winding 51*b* of the second magnetic triggering circuit to restore its condition of saturation to its original polarity and thereby produce an output pulse over output winding 51*c* and over line 65 and through diode 66 to trigger the second silicon control rectifier 49. In the event that an output pulse is produced on line 31 by the storage register 12, this output pulse is directed through the first input winding 51*a* of the second magnetic triggering circuit at the same time that the oscillator pulse is directed through winding 68. Consequently, if the storage register 12 produces an output pulse, the pulses through windings 51*a* and 68 of the second magnetic triggering circuit are produced at the same time and in opposition and, therefore, nullify one another so that the core 51 does not store a one and does not transfer an output pulse upon receiving the next succeeding clear impulse.

The magnetic oscillator circuit preferably comprises a core 69 having a clear winding 69*b*, an output winding 69*c*, and an automatic resetting winding 69*d*. The automatic resetting winding 69*d* is continuously energized by a negative potential 70 through a resistor 71 to pass a current therethrough of such polarity as to tend to maintain the core 69 saturated in a condition of storing a one therein. Consequently, upon each clear impulse being produced over line 43 and being directed through the clear winding 69*b*, the saturation condition of the core 69 is reversed to produce an output pulse over winding 69*c* which is stored on the capacitor 70. Upon the next transfer impulse being produced to control transfer line 44, the capacitor 70 is discharged through the second input winding 68 of the magnetic triggering circuit for producing a pulse as described above. In the interval between succeeding clear impulses, the continuously energized winding 69*d* of the oscillator restores the core 69 to its opposite polarity of saturation, thereby automatically conditioning the core 69 for the continuous production of output pulses upon receiving each clear impulse over line 43.

Recapitulating the overall operation of the power transferring circuit for responding to each output impulse over line 31 from the storage register, the power transferring circuit comprises a pair of silicon control rectifiers 48 and 49 being connected back-to-back together with a relay 36 adapted to be energized whenever the silicon control rectifier 48 is placed into a conducting condition. Upon receiving each of the serial impulses from the storage register over line 31, the impulse is directed to a magnetic triggering circuit including core 50 which thereafter produces an output pulse to trigger the rectifier 48 into operation thereby actuating the relay 36. At each recurring time instant when a pulse is not received from the storage register 12, over line 47, a magnetic oscillator 69 directs an impulse to a second magnetic triggering circuit, including core 51, which thereupon produces a pulse over line 64 to trigger the second silicon control rectifier 49 into operation. The second silicon control rectifier 49 functions to reset the first silicon control rectifier 48 by discharging the capacitor 63 thereby conditioning the switching circuit to commence anew.

As discussed above in FIG. 1, the synchronizing circuit 32 responds to each actuation of the keyboard 10 to produce an output synchronizing impulse over line 33, for the purpose of signalling the beginning of a pulse coding operation. As shown in FIG. 4, this circuit preferably comprises a saturable core 71 together with its associated windings which serves to actuate a switching transistor 72 and an output pulsing transformer 73 to produce the synchronizing pulses over line 33. In greater detail, the synchronizing circuit saturable core 71 is supplied with an input winding 71*a* that receives a pulse upon each actuation of the keyboard mechanism 10. This pulse reverses the direction of saturation of the core 71 whereby upon the core 71 receiving a clear impulse over line 43 and being directed through winding 71*b*, a pulse is induced on output winding 71*c* to a storage capacitor 75, thereby to store a negative charge thereupon. The storage capacitor 75 is connected to energize the base electrode of switching transistor 72 thereby to trigger the transistor 72 into operation and draw current from its collector to its emitter electrodes thereof. Current flow through the transistor 72 produces a current through the primary winding of transformer 73 and induces a voltage in the secondary winding 73*a* thereof in such direction as to maintain the transistor 72 conducting for a short interval of time. An additional secondary winding 73*b* of the transformer has induced therein a synchronizing output pulse which is directed over synchronizing output line 33. In the same manner as discussed above, the clear impulses being produced over line 43 and directed through the winding 71*b* of the saturable core 71 serve to reverse the direction of saturation of the core 71 to its original condition and thereby reset the core 71 in such condition as to be energized by the next succeeding actuation of the keyboard 10.

For producing the recurring series of constant current clear impulses over line 43 and the recurring series of transfer impulses over line 44 that are time delayed from the clear impulses over 43, there is provided a blocking oscillator 80, a constant current producer circuit 81 and a time delay circuit 83. The blocking oscillator 80 produces a uniform series of recurring pulses over line 92 that are directed to the constant current producer circuit 81 which thereupon produces constant current impulses over line 43 as described above to clear the saturable cores of the register and output circuits. The pulses from the blocking oscillator 80 are also directed through a time delay circuit 83 to produce time delayed transfer impulses over line 99. These time delayed impulses over line 99 are directed upwardly to trigger and fire a silicon control rectifier 102 whose power handling electrodes interconnect the transfer pulse line 44 and ground. Consequently upon the rectifier 102 being fired, a circuit is completed between each of the capacitors 47 in the storage register 12 and output circuit with the various transfer windings on the saturable cores, whereby those of the charged capacitors may discharge through the magnetic windings as discussed above to effect transfer of ones to the various stages of the registers and in the output circuit as previously described. The blocking oscillator 80 and constant current pulse producer circuit 81 are preferably magnetic circuits of types well known in the art and a description of the circuit configuration thereof is accordingly considered unnecessary.

Although but one preferred embodiment of the invention has been illustrated and described, it is believed evident that many changes may be made by those skilled in the art without departing from the spirit and scope of this invention. Accordingly, this invention is to be considered as being limited only according to the following claims appended thereto.

What is claimed is:

1. A digital pulse code generator comprising a storage register having a plurality of interconnected stages, one for each digit of the code, means for entering the code number to be transmitted into the register by simultaneously energizing different ones of the stages corresponding to the number, means for serially reading out the different digits of the number by cyclically transferring the condition of each stage to the next until the entered number has completely read out of the register as a series of time spaced impulses corresponding in number to the number of digits entered and being spaced in time from another according to spacing of the different ones of the energized stages, means for producing a synchronizing pulse at the beginning of the serial readout, a pair of silicon controlled rectifiers being interconnected by a capacitor in mutually self extinguishing relationship, a pair of switching devices, each being connected to trigger a different one of said rectifiers, means connecting the serial output of the register to energize both switching devices, and means associated with one of said switches for cyclically energizing that switch in synchronism with the cyclical read out of the storage register and in opposition thereto whereby said latter switch triggers its associated rectifier in the absence of energization from said register and the remaining switch triggers its associated rectifier upon receiving energization from said register.

2. In the generator of claim 1, each of said stages comprising a saturable core adapted to be normally in one condition of saturation and being energizable to reverse its condition of saturation to store a digit of said code number, and said pair of switches each including a saturable core connected to be energized by the storage register.

3. In the generator of claim 1, said pair of silicon controlled rectifiers each having a pair of main electrodes adapted to be energized by a source of potential and a triggering electrode, and said capacitor interconnecting like polarity main electrodes on both rectifiers, and means connecting each of said switching devices to energize the triggering electrode of a different one of said rectifiers.

4. In the generator of claim 1, said means for cyclically energizing one of said switches comprising a saturable core having a plurality of windings, one of said windings being energized continuously to normally maintain said core in saturation in one polarity and another of said windings being energized repetitively in synchronism with said storage register and in the opposite polarity, and an output winding on said core for producing a pulse for each reversal of the direction of saturation of the core.

5. In the generator of claim 1, said serial read out means including a repetitive pulse producer comprising a saturable core having a plurality of windings thereon, a switching transistor having a pair of electrodes in series circuit with one of said windings, and a third electrode and one of said pair of electrodes in series circuit with another of said windings, a time delay energizing means including a capacitor adapted to be progressively charged to trigger said transistor into conducting condition thereby to saturate said core and produce an impulse, and means interconnecting said capacitor to discharge through one of said windings and said transistor after said core is saturated thereby to reverse the direction of saturation of said core and automatically condition the pulse producer to repeat its sequence of operations.

6. In a pulse code generator, a multistage storage register having a plurality of input lines, one for each stage, and an output line, means for selectively energizing predetermined ones of said stages to store the code number to be generated in the form of a multiple digit number, means for serially reading out said register to produce a train of pulses corresponding to the stored number, said selective energizing means comprising a matrix having a number of groups of output lines with each group being interconnected with a different energizing line, means for connecting the output lines of each group to predetermined ones of the stages according to the predetermined code selected, and switching means for selectively applying power to the different energizing lines.

7. In the generator of claim 6, said matrix being readily disconnectable from the circuit for permitting a change in the code.

8. In a pulse code generator, a storage register including a plurality of cascaded storage devices with one such device for each digit of the code, keyboard selection means having a plurality of keys and a matrix interconnecting each of the keys to different preselected ones of the storage devices for simultaneously energizing different predetermined ones of said devices in a group for each different code number to be produced, means responsive to activation of any one of the keys for serially reading out said devices to produce a serial cycle of pulses corresponding in time to the total number of storage devices and corresponding in the number of pulses to the number of such devices that are energized by the selection means.

9. In the generator of claim 8, said selection means comprising a plurality of selectively actuable switches, with each switch being interconnected with predetermined ones of the devices to simultaneously energize its interconnected devices upon its actuation, and said serial read out means comprising a repetitively operating generator for pulsing all of said devices to serially transfer the energization condition of each device to the next succeeding device.

10. In the generator of claim 8, said storage devices being interconnected in cascade in said register and being energized simultaneously to store the selected code number, and being energized during readout to transfer the energized condition of each device to the next whereby at the last of said devices there is produced a timed sequence of pulses corresponding to the code number selected.

11. A keyboard operated pulse generator for selectively producing a different preselected code of impulses responsively to the actuation of different ones of the keys depressed comprising: a plurality of input lines each being energizable responsively to the actuation of a different key of the keyboard, a multistage storage register, matrix means interconnecting each of the input lines to preselected ones of the stages of the storage register according to a preselected code with certain ones of the stages of the storage register being connected to more than one of the input lines, and means responsive to the actuation of any one of the keys to serially read out said register, thereby to produce a predetermined serial code of pulses corresponding to that one of the keys being actuated.

12. A keyboard entry code generator comprising: a plurality of keys for selectively entering a desired number, a multistage storage register, and a matrix interconnecting different ones of the stages of the storage register to more than one of the keys according to a preselected code, said matrix comprising a preselected radix code converter, whereby by depressing a preselected one of the keys a number thereon is converted into the same number having a different radix in the storage register, and means responsive to the depression of any one of the keys for serially reading out the number in the register.

13. In an automatically operating keyboard code generator for selectively producing different codes of pulses responsively to the actuation of different ones of the keys of the keyboard, a shift register having a plurality of cascaded stages corresponding in number to the maximum number of digits of the code, a matrix having input lines interconnecting each of the keys with different preselected ones of the stages to simultaneously enter a different multidigit code in the stages of the register responsively to each different key actuated, and control means responsive to the actuation of any one of the keys for serially cycling said register to read out the code in serial pulse code form.

14. In the keyboard generator of claim 13, said matrix being detachably connectable between the keys and stages thereby enabling different matrices to be employed for changing the code.

15. In the keyboard generator of claim 13, a power output circuit energizable by the generator for employing each pulse of the serial code to actuate a power controlling circuit, and means interconnecting said power output circuit and said control means to deactuate the power controlling circuit after each actuation thereof.

References Cited by the Examiner

UNITED STATES PATENTS

| | | | |
|---|---|---|---|
| 2,635,229 | 4/53 | Gloess | 340—347 X |
| 2,984,823 | 5/61 | Spencer | 340—172.5 |

ROBERT C. BAILEY, *Primary Examiner.*

MALCOLM A. MORRISON, *Examiner.*